United States Patent [19]
Nakashima

[11] 3,789,636
[45] Feb. 5, 1974

[54] DEVICE IN AN AUTOMOBILE FOR PREVENTING AN ACCIDENTAL LOCKING OF A STEERING SHAFT

[75] Inventor: Yoshikatsu Nakashima, Nagoya, Japan

[73] Assignee: Kabushiki Kaisha Tokai Rika Denke Seisakusho, Mishikasugai-gun, Aichi Pref., Japan

[22] Filed: Mar. 15, 1972

[21] Appl. No.: 234,791

[30] Foreign Application Priority Data
Mar. 16, 1971 Japan.............................. 46-14527

[52] U.S. Cl. .................................. 70/252, 70/389
[51] Int. Cl. ........................................... B60r 25/02
[58] Field of Search ..... 70/239, 241, 243, 248, 250, 70/252, 254, 255, 257, 389; 200/44

[56] References Cited
UNITED STATES PATENTS
3,633,394 1/1972 Pieck et al. ....................... 70/252 X
3,673,829 7/1972 Mizuno ................................ 70/252

*Primary Examiner*—Werner H. Schroeder
*Attorney, Agent, or Firm*—Woodhams, Blanchard and Flynn

[57] ABSTRACT

Device in an automobile for preventing an accidental locking of a steering shaft in such a type of a locking system as a rotor of a cylinder lock is provided with a lock position of the steering shaft. The device comprises a stop provided in said rotor or in an associating locking bolt and a manually-operable means usually urged by a spring means to engage with said stop thereby to check a further rotation of the rotor from an OFF position of an ignition switch further to said lock position. For turning the rotor from the OFF position to the lock position, two manipulations, first, shifting said-manually operable means against the spring means to release it from an engagement with said stop and, second, turning the rotor with a key must be performed simultaneously. Thus constructed, the device can well prevent a danger of an accidental locking of the steering shaft while driving and assure a safety driving of the automobile.

3 Claims, 5 Drawing Figures

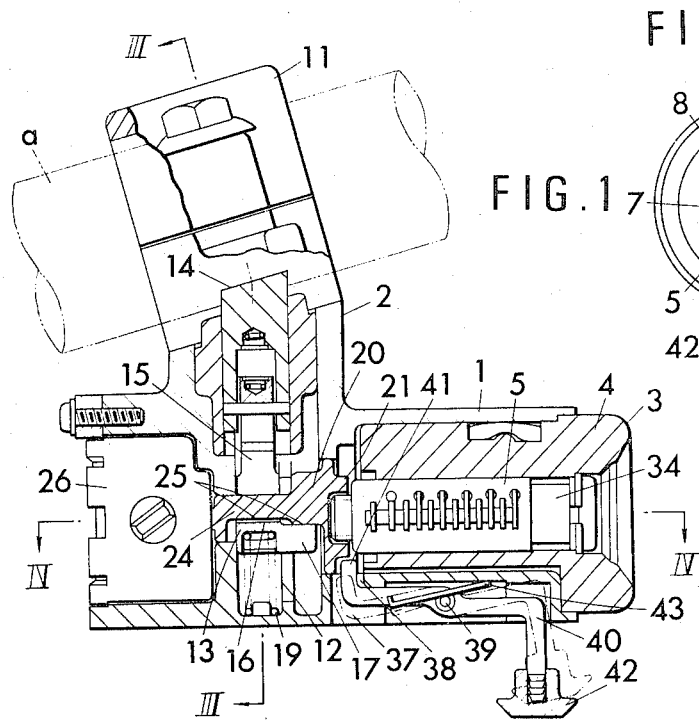

DEVICE IN AN AUTOMOBILE FOR PREVENTING AN ACCIDENTAL LOCKING OF A STEERING SHAFT

This invention relates to a device in an automobile for preventing an accidental locking of a steering shaft and more particularly, to an improvement in a locking system of the type wherein a rotor of a cylinder lock and a locking bolt in association therewith are turned from a usual OFF position further to a lock position in which a locking member protrudes into a rotation circle of the steering shaft.

In an automobile, the rotor of the cylinder lock is often turned with a key to the OFF position of an ignition switch, while driving along a long downhill road or so, to run by inertia intentionally, through mishandling of the key or accidentally by collision etc. However, in such a type of locking system, as the rotor is provided with a lock position relative to the steering shaft, it is feared that if the rotor in the OFF position as above-mentioned is further turned to the lock position through carelessness or accidentally to lock the steering shaft during driving, the automobile becomes out of control instantaneously.

It is, therefore, an object of the present invention to provide an improved locking device which is free from the danger of such accidental locking of a steering shaft and assures a safety driving of an automobile.

Essentially, according to the present invention, there is provided in a locking system of a steering shaft in an automobile wherein a rotor of a cylinder lock for an ignition switch and a locking bolt in association therewith are adapted to turn with a key from an OFF position of the ignition switch further to a lock position of the steering shaft in which a locking member protrudes into a rotation circle of the steering shaft, a device for preventing an accidental locking of the steering shaft which comprises a stop provided in either of said rotor and said locking bolt and rotatable in association therewith, and a manually-operable means having a projection arranged to protrude into a rotation circle of said stop between central angles of the OFF position and the lock position and a spring means for usually urging said manually-operable means toward the lock position, whereby locking of the steering shaft is performed by two manipulations, first, shifting said manually-operable means against said spring means to disengage said projection from the stop and, second, turning said rotor with the key.

Various further and specific objects, features and advantages of this invention will be better understood by the following description taken in connection with the accompanying drawings, in which;

FIG. 1 is a vertical sectional side view of a locking device which is one embodiment of the present invention;

FIG. 2 is a front view of the same;

FIG. 3 is a sectional front view taken along the line III—III of FIG. 1;

Figure 4:
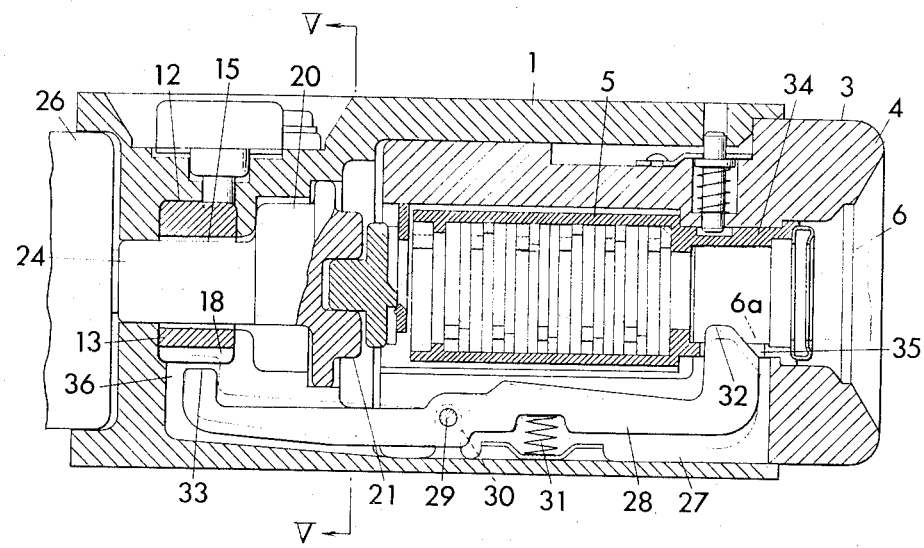
FIG. 4 is a sectional plan view taken along the line IV—IV of FIG. 1.

Referring now to FIGS. 1–5, numeral 1 represents an ignition switch housing having a casing 2 mounted on a steering shaft $a$. A cylinder lock generally represented by numeral 3 and comprising a barrel 4 and a rotor 5 is fixedly inserted in said housing 1. Said rotor 5 is adapted to rotate by an insertion of a key 6 from a lock position 7 of the steering shaft through OFF position (a radio-receivable position) 8 of the ignition switch, ON position 9 of the ignition switch and ON position 10 of a starter switch at a certain angle in a clockwise order, as shown in FIG. 2.

Said casing 2 is provided at its top with a corresponding fitting 11 and in combination therewith fixed to the steering shaft $a$. A guide groove 12 is formed in the housing 1 in a traversing direction. In said groove 12 is slidably fitted a locking member 13 whose top 14 is projectable into a rotation circle of the steering shaft $a$ through the casing 2. In said slidable locking member 13 is formed a window 15 having a rectilinear bottom 16 and an extending block 17 is integrally formed with the locking member extendingly from said bottom 16 toward the cylinder lock 3. The locking member 13 is further provided with a cut-out 18 just outside the window 15 and a spring 19 exerting a spring drive on the bottom of the member 13 toward the lock position thereof.

Figure 5:
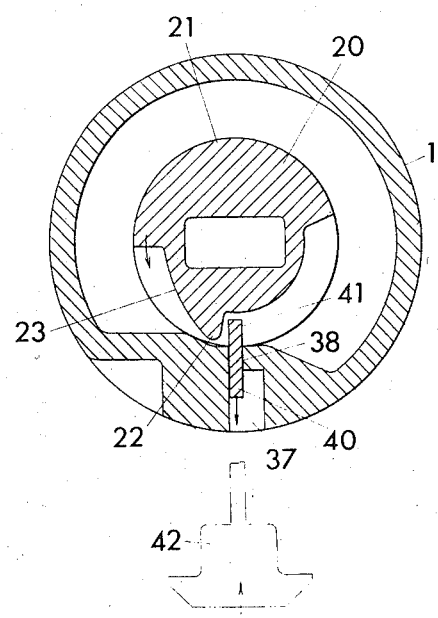
FIG. 5 is a sectional front view taken along the line V—V of FIG. 4.

The backward end of the rotor 5 is fixedly connected to a locking bolt 20 which is rotatable in association therewith and comprises a circular forward portion 21 and a backward portion 24 reduced in diameter. Said circular portion 21 has a stop 22 and a slanting face 23 as shown in FIG. 5. Said reduced portion 24 is connected to a movable portion 26 of the ignition switch through the window 15 of the locking member 13 and a cam face 25 is formed on one side of the locking bolt 20 corresponding to the bottom 16 of the window 15 and extending block 17 to give the locking bolt 20 a semi-circular configuration at this portion.

Numeral 28 represents a lever provided in an axially extending slot 27 in the barrel 4 and adapted to associate with an insertion of the key. Said lever 28 is pivoted with its axle 29 inserted in an elongated axle bore 30 and provided with a spring 31 in its forward and peripheral portion. A forward projection 32 of the lever 28 is so arranged as to protrude into a neck 34 of the rotor 5 through a circumferentially elongated slot 35 formed in said neck 34 while a backward projection 33 is so arranged as to protrude into the guide groove 12 through an aperture 36 formed in a side wall of said groove 12 thereby to engage with the cut-out 18 in the locking member 13. When the key 6 is inserted in the rotor 5, a rectilinear edge 6a of the key pushes the forward projection 32 outward as shown in a dotted line of FIG. 4 to bring the backward projection 33 into engagement with the cutout 18 of the locking member 13. Thus, the slidable locking member 13 is checked from projecting its top 14 into the rotation circle of the steering shaft $a$ even though the rotor 5 is turned to the locking position 7, and when the key 6 is withdrawn, the forward projection 32 protrudes into the neck 34 and simultaneously, the backward projection 33 is disengaged from the cut-out 18 thereby permitting the sliding movement of the member 13.

The aforementioned construction is already known to the art except the stop 22 and the slanting face 23.

Now entering into an improvement according to this invention, numeral 37 represents an axially extending slot formed in a circumferential portion of the housing 1 and having an aperture 38 in the backward portion corresponding to the stop 22 in the circular portion 21 of the locking bolt 20. A lever 40 is pivoted at an axle 39 traversing said slot 37. The backward projection 41 of said lever is so arranged as to protrude into the rotation circle of the stop 22 through said aperture 38. The lever 40 is further provided with a knob 42 projecting outward the housing 1 and spring 43 windingly mounted on the axle 39 for urging the projection 41 into the rotation circle of the stop 22.

The operation is described as follows;

The projection 41 of the lever 40 comes into engagement with the stop 22 at the OFF position 8 of the rotor 5 to prevent a counterclockwise rotation of the rotor 5 and the locking bolt 20 to the lock position 7. Therefore, the rotor 5 in combination with the locking bolt 20 can freely rotate only between the central angles at the OFF position 8 and the starting position 10 but not freely to the lock position 7. In order to turn the rotor 5 to the lock position 7 from the central angle at which the stop 22 engages with the projection 41, it is indispensable for a driver to do two manipulations, first, pushing the knob 42 to swing the lever 40 against the spring 43 thereby to disengage the projection 41 from the stop 22 and, second, turning the rotor 5 counterclockwisely with the key 6. For locking the steering shaft *a*, said two manipulations must be performed in association with each other with both hands.

When the locking bolt 20 is thus turned to the lock position 7, the locking member 13 which has been pressed downward at the rectilinear bottom 16 of the window 15 by the cam face 25 is set free from the downward restriction. When the key 6 is then withdrawn from the rotor 5, the lever 28 acts, as described hereinabove, to disengage its backward projection 33 from the cutout 18. Incidentally, the locking member 13 protrudes its top 14 into the rotation circle of the steering shaft *a* by the spring drive of the spring 19 thereby to lock the steering shaft. In the present embodiment, the lever 28 is not absolutely necessary.

As apparent from the foregoing description, the improved locking device according to the present invention can well prevent a danger of an accidental locking of the steering shaft while driving and assure a safety driving of the automobile. Moreover, the construction is simple and can be manufactured at a low cost.

What is claimed is:

1. In a locking system for the steering shaft of an automotive vehicle, including:

a cylinder lock device including a stationary housing and key-operated rotor means rotatably supported within said housing for rotation between a plurality of positions, said rotor means having a locking bolt associated therewith, said rotor means being angularly movable by a key from a first position wherein the vehicle ignition switch is off to a second position wherein said steering shaft is locked against rotation;

said lock device also including a locking member operatively connected to said rotor means and movable from a released position to a locked position in response to movement of said rotor means from said first to said second position, said locking member when in said locked position having a portion thereof projecting into engagement with said steering shaft for preventing rotation thereof;

a safety device for preventing accidental locking of said steering shaft, said safety device including a stop mounted on said rotor means and rotatable therewith, manually operable release member movably supported on said housing and normally maintained in a location for engaging said stop for preventing movement of said rotor means from said first to said second position, and spring means normally urging said release member into said location;

the improvement wherein said release member comprises an elongated lever pivotally mounted intermediate the ends thereof on said housing for swinging movement about an axis substantially transverse to the rotational axis of said rotor means, said lever having one end thereof positioned for engagement with said stop and the other end thereof projecting outwardly of said housing and having knob means thereon adapted to be manually engaged by the vehicle operator, said knob means being spaced sidewardly and axially inwardly a substantial distance from the key-receiving end of said rotor means, whereby movement of the rotor means from said first to said second position for permitting locking of said steering shaft requires, first, engaging said knob means with one hand and manually swinging said lever for causing said one end thereof to move away from said location to disengage same from said stop and, second, engaging said key with the other hand and manually turning said rotor means and said key from said first to said second position, whereby said locking member is moved into locking engagement with said steering shaft.

2. In a locking system according to claim 1, wherein said lever has a substantially Z-shaped configuration.

3. In a locking system according to claim 1, wherein the ends of said lever are both moved, in response to pivotal swinging movement of said lever, in a direction which is substantially perpendicular to the rotational axis of said rotor means.

* * * * *